(12) United States Patent
Peterson

(10) Patent No.: US 12,513,008 B2
(45) Date of Patent: Dec. 30, 2025

(54) SYSTEM AND METHOD FOR APPROVING TRANSACTIONS

(71) Applicant: OL SECURITY LIMITED LIABILITY COMPANY, Wilmington, DE (US)

(72) Inventor: Robert W. Peterson, Plano, TX (US)

(73) Assignee: OL SECURITY LIMITED LIABILITY COMPANY, Wilmington, DE (US)

( * ) Notice: Subject to any disclaimer, the term of this patent is extended or adjusted under 35 U.S.C. 154(b) by 0 days.

(21) Appl. No.: 18/495,303

(22) Filed: Oct. 26, 2023

(65) Prior Publication Data

US 2024/0056315 A1  Feb. 15, 2024

Related U.S. Application Data

(60) Continuation of application No. 17/206,689, filed on Mar. 19, 2021, now Pat. No. 11,831,791, which is a
(Continued)

(51) Int. Cl.
*G06Q 20/00* (2012.01)
*G06Q 20/08* (2012.01)
(Continued)

(52) U.S. Cl.
CPC ......... *H04L 9/3271* (2013.01); *G06Q 20/085* (2013.01); *G06Q 20/3224* (2013.01);
(Continued)

(58) Field of Classification Search
CPC ............... H04L 9/3271; H04L 63/0853; H04L 2209/56; H04L 2209/80; G06Q 20/085;
(Continued)

(56) References Cited

U.S. PATENT DOCUMENTS

| 6,612,488 B2 | 9/2003 | Suzuki |
| 2001/0034707 A1 | 10/2001 | Sakaguchi |

(Continued)

FOREIGN PATENT DOCUMENTS

| CN | 1954335 | 4/2007 |
| JP | 2002342845 A | * 11/2002 |

(Continued)

OTHER PUBLICATIONS

Foreign Ref Incldued (Year: 2001).*
(Continued)

*Primary Examiner* — Dante Ravetti
(74) *Attorney, Agent, or Firm* — Schwabe, Williamson & Wyatt, P.C.

(57) ABSTRACT

In a transaction between a merchant and a payer, approval of the transaction may be provided by a payment processing system using authentication information provided from a mobile device of the payer. The authentication information may include a location of the payer mobile device which may be compared to a location of a merchant payment device such that the transaction is approved if the payer mobile device is within a defined distance of the merchant payment device.

22 Claims, 5 Drawing Sheets

Related U.S. Application Data continuation of application No. 15/828,089, filed on Nov. 30, 2017, now abandoned, which is a division of application No. 12/629,937, filed on Dec. 3, 2009, now abandoned.

(51) Int. Cl.

| | | |
|---|---|---|
| *G06Q 20/32* | (2012.01) | |
| *G06Q 20/40* | (2012.01) | |
| *G06Q 30/0601* | (2023.01) | |
| *G06Q 40/12* | (2023.01) | |
| *H04L 9/32* | (2006.01) | |
| *H04W 4/029* | (2018.01) | |
| *H04L 9/40* | (2022.01) | |

(52) U.S. Cl.
CPC ......... *G06Q 20/40* (2013.01); *G06Q 30/0603* (2013.01); *G06Q 40/12* (2013.12); *H04W 4/029* (2018.02); *H04L 63/0853* (2013.01); *H04L 2209/56* (2013.01); *H04L 2209/80* (2013.01)

(58) Field of Classification Search
CPC ............... G06Q 20/3224; G06Q 20/40; G06Q 30/0603; G06Q 40/12; G06Q 20/16; G06Q 20/24; H04W 4/029; H04W 4/02
USPC .......................... 705/16, 21, 59; 380/44, 262
See application file for complete search history.

(56) References Cited

U.S. PATENT DOCUMENTS

| | | | |
|---|---|---|---|
| 2002/0066042 | A1 | 5/2002 | Matsumoto et al. |
| 2003/0182194 | A1 | 9/2003 | Choey et al. |
| 2004/0019564 | A1 | 1/2004 | Goldthwaite et al. |
| 2004/0087339 | A1 | 5/2004 | Goldthwaite et al. |
| 2004/0215963 | A1 | 10/2004 | Kaplan |
| 2004/0254868 | A1 | 12/2004 | Kirkland et al. |
| 2007/0011099 | A1 | 1/2007 | Sheehan |
| 2007/0022058 | A1 | 1/2007 | Labrou et al. |
| 2007/0174082 | A1 | 7/2007 | Singh |
| 2007/0184818 | A1 | 8/2007 | Clough |
| 2008/0059375 | A1* | 3/2008 | Abifaker .............. G06Q 20/327 705/44 |
| 2008/0077534 | A1 | 3/2008 | Son |
| 2008/0162346 | A1 | 7/2008 | Aaron et al. |
| 2008/0183622 | A1 | 7/2008 | Dixon et al. |
| 2008/0222038 | A1 | 9/2008 | Eden et al. |
| 2008/0275760 | A1* | 11/2008 | Easterly ................. G06Q 20/20 705/14.1 |
| 2008/0319914 | A1 | 12/2008 | Carrott |
| 2009/0094126 | A1 | 4/2009 | Kilian et al. |
| 2009/0106160 | A1 | 4/2009 | Skowroneck |
| 2009/0113205 | A1 | 4/2009 | Labaton |
| 2009/0143104 | A1 | 6/2009 | Loh et al. |
| 2009/0206157 | A1 | 8/2009 | Heffez et al. |
| 2009/0222891 | A1 | 9/2009 | Heffez |
| 2009/0248518 | A1* | 10/2009 | Shigematsu .......... G06Q 40/00 705/38 |
| 2009/0265552 | A1 | 10/2009 | Moshir et al. |
| 2010/0332267 | A1 | 12/2010 | Etchegoyen |
| 2011/0137804 | A1 | 6/2011 | Peterson |
| 2014/0200957 | A1 | 7/2014 | Biggs |
| 2021/0211311 | A1 | 7/2021 | Peterson |

FOREIGN PATENT DOCUMENTS

| | | |
|---|---|---|
| JP | 2004240725 | 8/2004 |
| JP | 2005229278 | 8/2005 |
| JP | 2006164035 | 6/2006 |
| JP | 2007521586 | 8/2007 |
| KR | 20010110280 | 12/2001 |
| KR | 20040078954 | 9/2004 |
| KR | 20060025495 | 3/2006 |
| WO | 2005067402 | 7/2005 |
| WO | 2006022513 | 3/2006 |
| WO | 2006109574 | 10/2006 |
| WO | 2011068624 | 6/2011 |

OTHER PUBLICATIONS

Korean Intellectual Property Office; English abstract, KR 10-2004-0078954; published Sep. 14, 2004; 2 pages.
Patent abstracts of Japan; JP patent Office Publication No. 2006-164035; NEC Corp.; Jun. 22, 2006; 1 Page.
Patent abstracts of Japan; JP patent Office Publication No. 2004-240725; Mitsubishi Electric Corp.; Aug. 26, 2004; 1 Page.
Patent abstracts of Japan; JP Patent Office Publication No. 2005-229278; Fuji Photo Film Co. Ltd.; Aug. 25, 2005; 1 page.
European Patent Office; IB International Preliminary Report on Patentability and Written Opinion of the ISA; PCT/US2010/055620; Jun. 14, 2012; 10 pages.
KIPO; International Search Report; PCT/US2010/055620; Aug. 25, 2011; 3 pages.
European Patent Office; EP 10779606.2 Search Report; Mar. 2, 2017; 8 pages.

\* cited by examiner

SYSTEM AND METHOD FOR APPROVING TRANSACTIONS

CROSS REFERENCE TO RELATED APPLICATIONS

This application is a continuation of U.S. application Ser. No. 17/206,689, filed Mar. 19, 2021, which is a continuation of U.S. application Ser. No. 15/828,089, filed Nov. 30, 2017, which is a divisional of U.S. application Ser. No. 12/629,937, filed on Dec. 3, 2009, each disclosure of which is herein incorporated by reference in its entirety.

FIELD OF THE INVENTION

This disclosure relates to systems and methods for approving commercial transaction such as transactions between a merchant and a payer. In particular, though not exclusively, the disclosure relates to transactions involving credit cards, debit cards, and the like.

BACKGROUND OF THE INVENTION

With the exception of cash transactions, most commercial transactions between a merchant and a customer typically use some form of payment identification device such as a credit card, debit card, loyalty card, or the like. Such transactions require approval by the administrator or provider of the payment identification card. Approval may be provided by various means such as a personal identification number, password, or presence of a physical payment authorization device (e.g., credit card). These solutions don't deal effectively with some classes of fraud, such as counterfeit credit cards, and use of a real card using a fraudulent merchant account. In particular, a person frequently traveling to foreign countries must either notify the institution issuing the card before every trip or forgo the crude default protection of disallowing transactions originating in a foreign country.

What is required is an improved system and method for identifying fraudulent attempts to use a payment authorization device based on the location of the device.

SUMMARY OF THE INVENTION

In one aspect of the disclosure, there is provided a method for approving a transaction between a merchant payment device of a merchant and a payer identification device of a payer. The method comprises identifying the payer from the payer identification device at the merchant payment device, identifying a mobile communications device of the payer, communicating with the mobile communications device to receive a communication from the mobile communications device which indicates authentication data, and determining an approval for the transaction from the authentication data.

In one aspect of the disclosure, there is provided a payment processing system for approving a transaction between a merchant payment device of a merchant and a payer identification device of a payer. The payment processing system may be configured to receive a transaction record that indicates the payer identification device and the merchant payment device. The payment processing system may also be configured to analyze authentication data from a mobile communications device of the payer, approve the transaction using the authentication data, and indicate the approval of the transaction to the merchant payment device.

In one aspect of the disclosure, there is provided a computer-readable medium comprising computer executable instructions for execution by a processor of a device, that, when executed, cause the processor to read a payment identification device of a payer, identify a mobile communications device of the payer, request authentication information from the mobile communications device, receive the authentication information from the mobile communications device, generate a transaction record incorporating the authentication information, and provide the transaction record to a payment processing system.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
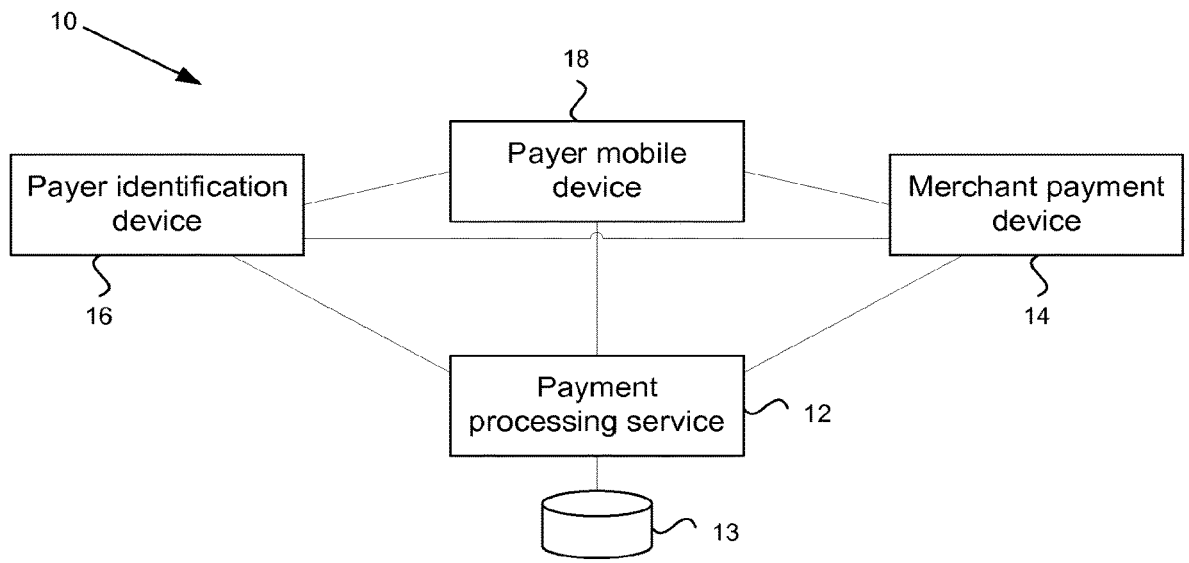
FIG. 1 illustrates components of a transaction system of the present disclosure.

A system 10 in accordance with an embodiment of the disclosure is illustrated in FIG. 1. In the system 10, there is provided a payment processing system 12 that interacts with a merchant payment device 14 through known communications protocols such as TCP/IP, FTP, EFTPOS etc. During a transaction, a payer, e.g., a customer, may identify a payer identification device 16 to the transaction. The payer identification device may be a credit card, debit card, or other form of account identifier, which in some embodiments, may include a mobile telecommunications device. The merchant payment device 14 (e.g., a credit card reader, a Bluetooth radio) is able to extract from the payer identification device 16 sufficient information, e.g., account number or card number, to pay the merchant. The merchant payment device 14 may communicate the payer information to the payment processing system 12 for verification. The payment processing system 12 may include a database 13 which stores payer identification including payer name, contact details, account information, credit limit and other required information for verifying transactions of the payer. In any typical legitimate transaction between the payer and the merchant, a mobile telecommunications device 18 of the payer will be available. In an embodiment of the disclosure, the ubiquitous nature of mobile devices is taken into account so that the payer's mobile device can be used in the transaction as an additional verification tool.

Figure 2:
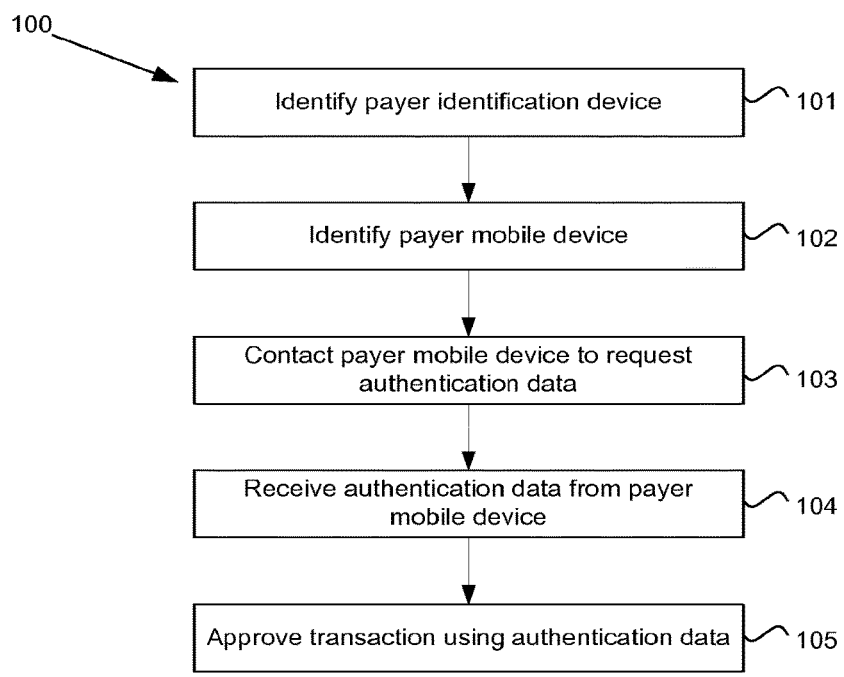
FIG. 2 illustrates a method for approving a transaction.

A method for verifying a transaction using a payer's mobile device is shown in the, flowchart 100 of FIG. 2. At step 101, the merchant payment device 14 scans, reads or otherwise identifies the payer identification device 16. At step 102, a mobile communications device 18 of the payer is identified, e.g., from data associated with the payer identification device 16, or from other data provided at the transaction, e.g., by communication direct from the payer. The merchant payment device 14 contacts the payer mobile device 18 to request authentication data (step 103) which is received at step 104. The authentication data is then used to determine an approval for the transaction (step 105), e.g., by providing the authentication data to a payment processing system 12.

The authentication data may take several forms, including the location of the payer mobile device or previous transaction history of the payer, known to the payer mobile device, which may or may not be known to the merchant payment device.

The authentication data may be provided from the payer mobile device to the payment processing service or to the merchant payment device and via any necessary intermediaries such as routers, network providers and the like.

The method described in FIG. 2 may be used to tie validation and authorization of a payment transaction to the locations of the entities involved. That is, the method may extend transaction authorization to include geolocation information. If the payer identification device 16 (credit card, debit card, cell phone acting as a credit card, etc.) is present, the geolocation of the payer mobile device 18 is compared during the card processor's authorization processing to other geolocation information, such as the location of the merchant's store, to establish that the person authorized to execute the transaction is in approximately the same location as the payer identification device 16. In simple terms, if the authorized card holder isn't near the card reader, the transaction should either be declined or additional identity confirmation should be conducted.

Figure 3:
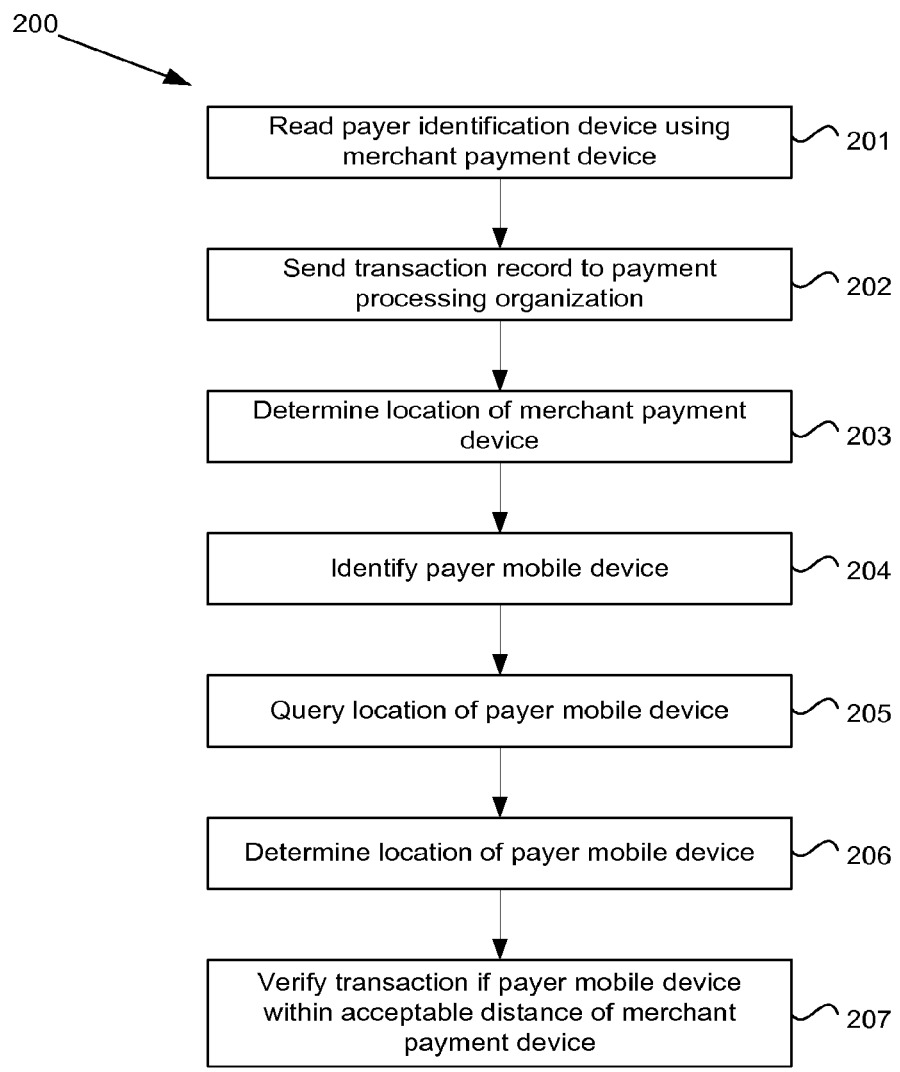
FIG. 3 illustrates a method for approving a transaction using location data of a payer mobile device.

In one embodiment, illustrated in the flowchart 200 of FIG. 3, the merchant payment device 14 may be used to read the payer identification device 16 to pay a merchant (step 201). The merchant payment device 14 sends to the payment processing system 12 a transaction record (step 202) which identifies the payer identification device 16, the merchant payment device 14 and other details of the transaction such as the amount, time, etc. The transaction record may be used to determine a geolocation of the merchant payment device (step 203). In one embodiment, the location of the merchant payment device 14 may be known locally in the payment processing system 12, e.g., stored in a local database 13, and may be retrieved from the database 13 using an identity of the merchant or the merchant payment device 14. In an alternative embodiment, in particular where the merchant payment device 14 may be mobile, the transaction record may include the geolocation of the merchant payment device 14, e.g., as determined by an internal GPS system of the merchant payment device 14 or other location determination system.

At step 204, the merchant payment device 14 may identify the mobile communications device 18 and request the current location of the mobile communications device 18 (step 205) which is received at step 206 and added to the transaction record. In an alternative embodiment, the database 13 of the payment processing system 12 may store contact details for the mobile communications device 18 such that steps 204, 205, 206 are performed by the payment processing system once the payer has been identified from the transaction record.

In one embodiment, the payer mobile device 18 may provide location information without user input. In an alternative embodiment, a message, such as an SMS message may be sent to the payer's mobile device 18, requiring an SMS response from the payer, with the location of the payer mobile device 18 being extracted from the response SMS message. If the payer mobile device 18 is within an acceptable distance from the location reported by the merchant payment device 14, the merchant payment device 14 is sent a message approving the transaction (step 207). The acceptable distance may depend on the transaction environment. For example, transactions with merchants where the payer may often be in a car, such as in a drive-through premises, may allow a greater distance than transactions where customers are generally slower or more stationary. Typical allowable distances are considered to be 100 feet for a casual restaurant, 20 feet for a retail store, and 10 feet for a fast food restaurant. The typical distance for each merchant is stored in the Payment Processing Service database 13.

In one embodiment, the transaction record may be complete when first sent from the merchant payment device 14 to the payment processing system 12. This has the advantage that a location of the mobile communications device 18 and the merchant payment device 14 are known at the immediate time of the transaction. However, the transaction record may also be sent in multiple stages. For example, the payment processing system 12 may separately query the merchant payment device 14 for its current location, which the merchant payment device 14 may add to the transaction record in response to the query.

Figure 4:
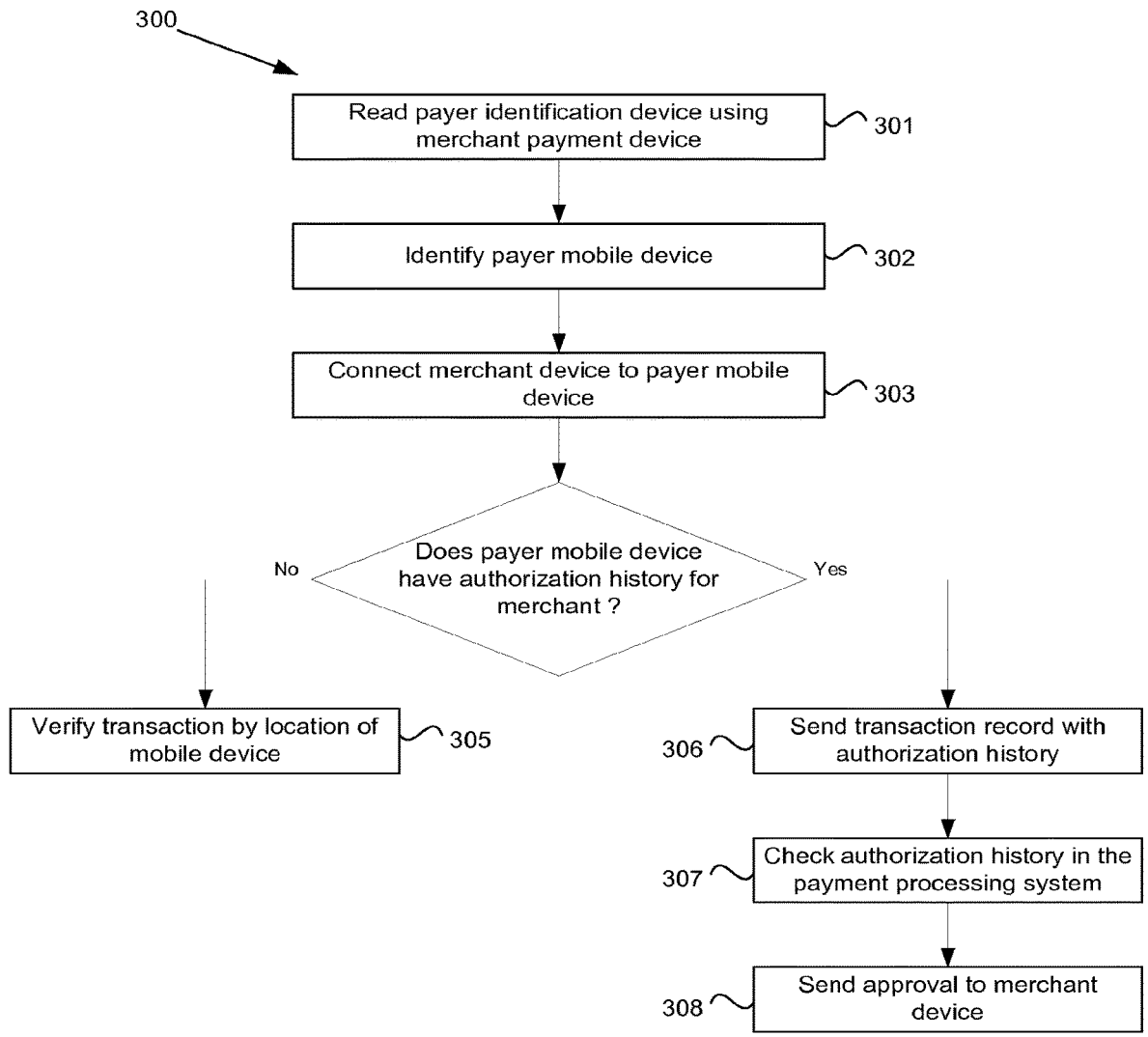
FIG. 4 illustrates a method for approving a transaction using transaction history known to a payer mobile device.

In one embodiment illustrated in the flowchart 300 of FIG. 4, the merchant payment device 14 is used to read the payer identification device to pay a merchant (step 301). The merchant payment device 14 looks for the payer mobile device 18 (step 302) (e.g., cell phone, PDA, MID, etc.) and connects to the payer mobile device 18 (step 303), which communicates a previous transaction history, such as an authentication history for the merchant payment device 14 (step 304). If the payer mobile device 18 is not present or the registration check fails, the transaction requires additional verification before being accepted. The merchant payment device 14 sends the transaction record to the payment processing service 12 indicating that the payment processing system 18 can verify the transaction (step 305) by contacting the payer mobile device 18 using the process illustrated in FIG. 3 (from step 203). If the merchant payment device 14 verifies at step 304 that the payer identification device 16 has been previously authorized by the payer mobile device 18 for the merchant, the merchant payment device indicates the authorization history in the transaction record to the payment processing service. The payment processing service 12 processes the transaction, include checking the authorization history. If the validations succeed, the payment processing service 12 sends to the merchant payment device 14 a message approving the transaction (step 308). In embodiments such as this, e.g., where independent location verification is not necessarily used in the authentication step, it is conceivable that the payment identification device 16 and the payer mobile device 18 may be merged into a single device.

Figure 5:
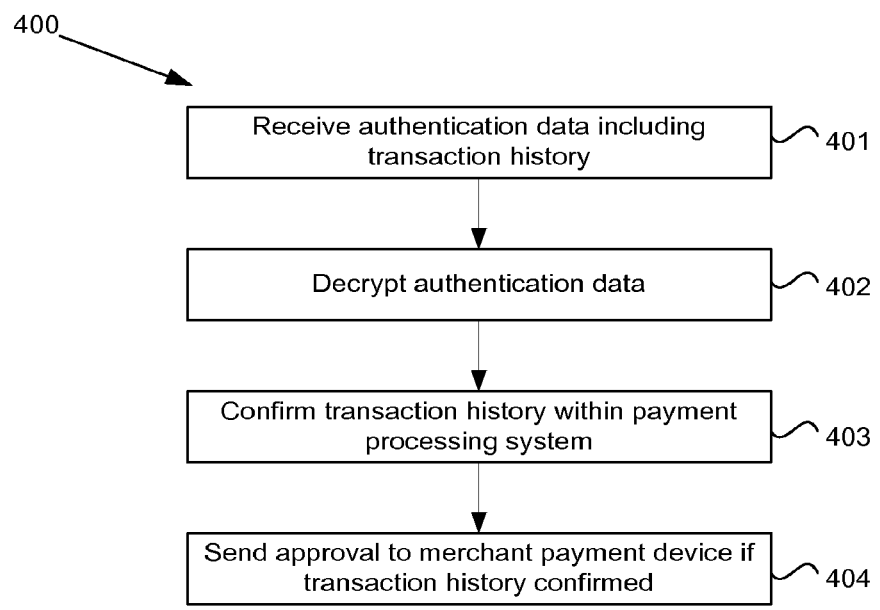
FIG. 5 illustrates a payment processing system process.

In one embodiment, the mobile communications device may provide additional authentication information that is unknown to the merchant and/or the merchant payment device for independent verification in the payment processing system. When the merchant payment device 14 queries the payer mobile device 18 for the payer mobile device's authentication information, in addition to providing the payer mobile device's most recent location, the payer mobile device 18 may also include information about the previous transaction, if any, involving the payer identification device 16. For example, the encrypted authentication information might include one or more of the geolocation, timestamp, merchant identity or transaction amount of the previous transaction, which is data the merchant is unlikely to possess and which ties the authentication information to the current transaction. The payer mobile device 18 returns the authentication data to the merchant payment device 14 in an encrypted form not decipherable by the merchant payment device 14. The merchant payment device 14 sends to the payment processing system 12 a transaction record that includes the geolocation of the merchant payment device 14 and the encrypted authentication information provided by the payer mobile device. The process at the payment processing end is shown in the flowchart 400 of FIG. 5. At step 401, the payment processing service 12 receives the transaction record and decrypts the authentication data provided by the payer mobile device 18 (via the merchant payment device 14) (step 402). The payment processing system 12 may verify the authentication data within the payment processing system (step 403), for example by retrieving details of the previous transaction from the database 13 and comparing the details with the data provided in the transaction record. In one embodiment, the previous transaction history may be sufficient to approve the transaction, without using the location data (step 404). Alternatively, the location data may also be such that if the payer mobile device 14 is within the defined acceptable distance from the location reported by the merchant payment device 14, then the payment processing system 12 may indicate to the merchant payment device 14 that the transaction is approved. Otherwise, if the authentication data fails these or other tests the payment processing service 12 may require additional verification before being accepted. By providing additional encrypted authentication information unknown to the merchant payment device 14 and incorporating the encrypted data in the transaction record, the system can reduce the possibility of replaying the encrypted authentication information which may lead to false or fraudulent approval of the transaction.

In one embodiment, the encrypted authentication data provided by the payer mobile device 18 may be supplemented by additional encrypted data from the payer identification device 16. For example, a payer identification device 16 may be provided with geolocation capabilities, such as from an internal GPS receiver which can be provided to the merchant payment device 14 during a transaction. To reduce the possibility of replaying the encrypted authentication information, merchant payment device sends to the transaction processor a transaction record that includes the encrypted authentication information provided by the payer identification device 16, and the encrypted authentication information provided by the payer mobile device 18. The payment processing service 12 processes the transaction record, including decrypting the authentication data provided by the payer identification device 16 and payer mobile device 18. If either the payer identification device 16 or the payer mobile device 18 is outside the acceptable distance from the location reported by the merchant payment device 14, or the authentication data fails some other test, the payment processing service may seek additional verification before approving the transaction. If the payment processing service 12 checks succeed, the payment processing service 12 sends to the merchant payment device 14 a message approving the transaction.

Figure 6:
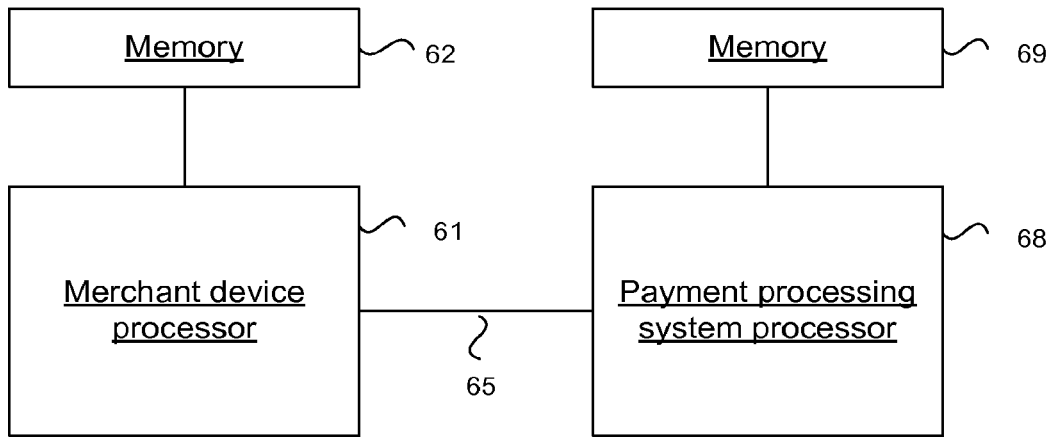
FIG. 6 illustrates a processor and memory of a merchant payment device in communication with a processor and memory of a payment processing system.
Figure 7:
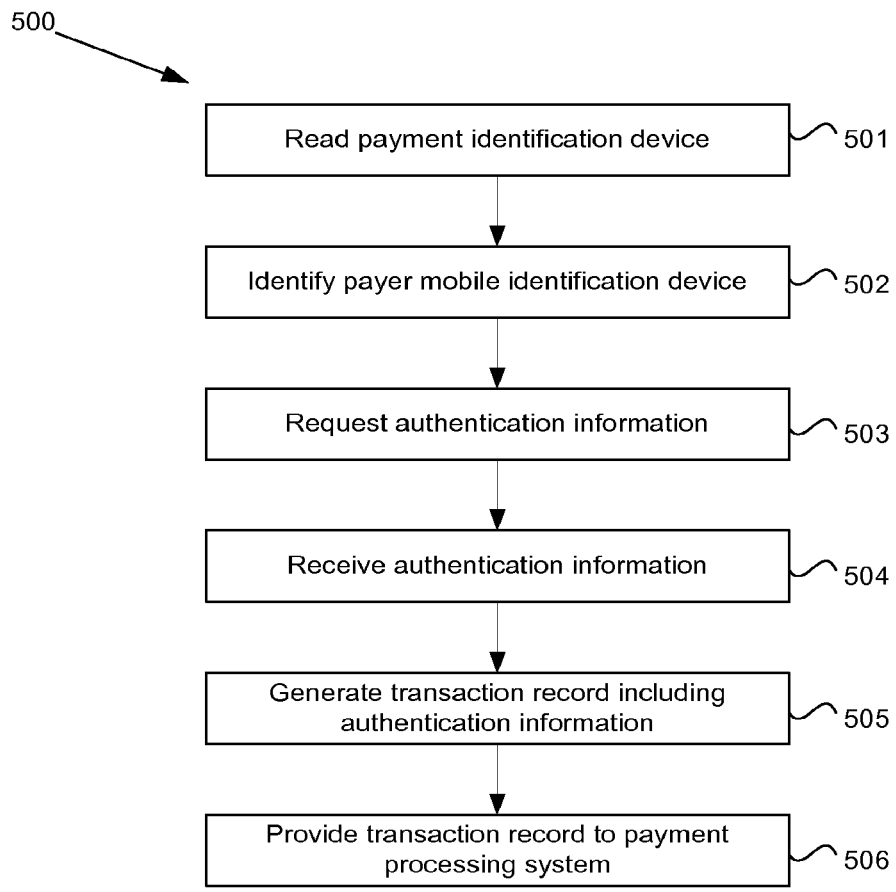
FIG. 7 illustrates an instruction set for executing on the merchant payment device processor of FIG. 6.

The components of the system 10 may be embodied in hardware, software, firmware or a combination of hardware, software and/or firmware. In a hardware embodiment, a merchant payment device may include a processor 61 operatively associated with a memory 62 as shown in FIG. 6. The memory 62 may store an instruction set 500 executable by the processor 61. When executed, the instruction set 500, shown in FIG. 7, causes the processor to commence a transaction by reading a payment identification device of a payer (step 501). After identifying a mobile communications device of the payer (step 502), a request for authentication information is sent to the mobile communications device (step 503) with the authentication information being received from the mobile communications device at step 504. The processor 61 then generates a transaction record incorporating the authentication information (step 505) and provides the transaction record to a payment processing system (step 506) for subsequent approval.

As shown in FIG. 6, the processor 61 of the merchant device may communicate the transaction record to a processor 68 and associated memory 69 of the payment processing system 12 through a suitable communications link 65. In addition, the processor 61 of the merchant device and/or the processor 68 of the payment processing system 12 may communicate with a processor and memory of a PayerMobile Device (not shown), for retrieving the required authentication information.

Embodiments of the system described above can be used to improve authorization confidence for a significant fraction of credit card uses, i.e., when the cardholder presents the physical card to a merchant and for other forms of payer identification devices. Thus, the system may be used to reduce credit card fraud by reducing the successful use of stolen credit cards, cloned credit cards, or fraudulent merchant card readers.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

The invention claimed is:

1. An apparatus, comprising:
   a merchant processing device comprising 1) a card interface to extract an account number or card number from a card or another payer identification device for a payment, 2) a static, or mobile, at least one processor, and 3) at least one memory having instructions stored thereon that, in response to execution by the at least one processor, cause the at least one processor to perform operations including:
   extracting, using the card interface, the account number or the card number from the card or the other payer identification device;

collecting, from a mobile phone or another mobile device associated with the payment and carried by a person, data including, or derived from, a prior transaction history known to the mobile phone or the other mobile device carried by the person, wherein the prior transaction history includes an authentication history for the merchant processing device, and wherein the collection of the data includes sending a message to the mobile phone or the other mobile device and extracting a location of the mobile phone or the other mobile device associated with a response to said message;

determining whether a transaction between a merchant and a payer is approved based at least in part on whether the prior transaction history known to the mobile phone or the other mobile device carried by the person, including the authentication history for the merchant processing device, coincides with payer identification information in a data store, and further based at least in part on whether the location coincides with an excepted location within an acceptable distance; and completing the transaction in response to approval.

2. The apparatus of claim 1, wherein the determining comprises:

transmitting the collected data, or data derived therefrom, to a remote payment processing service having access to the data store; and identifying an indication of approval from the remote payment processing service following the transmitting.

3. The apparatus of claim 2, wherein the transmission comprises a transaction record that indicates 1) the card or the other payer identification device, and 2) the merchant payment device.

4. The apparatus of claim 3, wherein the transmission further comprises a transaction amount.

5. The apparatus of claim 3, wherein the transmission includes a timestamp.

6. The apparatus of claim 2, wherein at least a portion of the collected data is in an encrypted form not decipherable by the merchant payment device, and wherein the transmission includes the portion of the collected data in the encrypted form.

7. The apparatus of claim 1, wherein the operations are performed autonomously by the merchant payment device, followed by the extracting the card number or the account number using the card interface.

8. The apparatus of claim 1, wherein the operations further comprising contacting the mobile phone or the other mobile device, wherein the collected data is contained in a short message service (SMS) message or another message received at the merchant payment device from a remote network following the contacting.

9. The apparatus of claim 1, wherein the collected data is received over a short range wireless interface of a short range radio.

10. The apparatus of claim 1, wherein the collected data is collected by scanning the mobile phone or the other mobile device.

11. The apparatus of claim 10, wherein the payer identification device is part of the mobile phone or the other mobile device carried by the person, and the scanning utilizes a short range wireless radio.

12. The apparatus of claim 1, wherein the mobile phone or the other mobile device carried by the person is a first device, and wherein the payer identification device is a second device that is different than the first device.

13. The apparatus of claim 1, wherein the payer identification device is part of the mobile phone or the other mobile device carried by the person.

14. The apparatus of claim 1, wherein the operations further comprise identifying the mobile phone or the other mobile device carried by the person from information collected by the card interface.

15. The apparatus of claim 1, wherein the operations further comprise identifying the mobile phone or the other mobile device carried by the person from a user input provided by the person.

16. A method utilizing a merchant processing system including a card interface to extract data including an account number or card number from a card or another payer identification device, the method comprising:

scanning or reading, using the card interface, the card number or the account number from a payment device, wherein the payment device comprises the card or the other payer identification device;

collecting, from a mobile device carried by a person, data including, or derived from, a prior transaction history known to the mobile device, wherein the prior transaction history includes an authentication history for the merchant processing system, and wherein the collection of the data includes sending a message to the mobile device and extracting a location of the mobile device associated with a response to said message;

determining whether a transaction between a merchant and a payer is approved based at least in part on whether the prior transaction history known to the mobile device coincides with payer identification information in a data store;

wherein the prior transaction history known to the mobile device includes authentication data unknown to the merchant processing system, and whether determining whether the transaction between the merchant and the payer is approved is further based at least in part on whether the authentication data for the merchant processing system coincides with the payer identification information in the data store, and further based at least in part on whether the location coincides with an excepted location within an acceptable distance; and completing an electronic payment in response to approval of the transaction.

17. The apparatus of claim 16, wherein the determining further comprises:

collecting data for authentication from the mobile device, wherein the data for authentication includes the prior transaction history;

transmitting the data for authentication, or data derived therefrom, to a remote payment processing service having access to the data store; and identifying an indication of approval from the remote payment processing service, wherein the completing the electronic payment is in response to the identifying the indication of approval.

18. The apparatus of claim 16, wherein the mobile device is in range of a short range wireless radio.

19. The apparatus of claim 18, wherein the payer identification device is part of the mobile device, and the scanning utilizes the short range wireless radio.

20. The apparatus of claim 16, wherein the mobile device is a first device, and wherein the payer identification device is a second device that is different than the first device.

21. The method of claim 16, further comprising:
verifying whether the card or the other payer identification device has been previously authorized by the mobile device, for the merchant; and
indicating, by the merchant processing system an authorization history, to a payment processing service;
wherein said indicating is in response to verifying that the card or the other payer identification device has been previously authorized by the mobile device, for the merchant.

22. The method of claim 16, further comprising:
when the mobile device is not near the card interface, obtaining additional verification before proceeding with the transaction.

* * * * *